United States Patent
Kozaki et al.

(10) Patent No.: US 10,803,751 B2
(45) Date of Patent: Oct. 13, 2020

(54) PROCESSING DEVICE

(71) Applicant: MITSUBISHI ELECTRIC CORPORATION, Tokyo (JP)

(72) Inventors: Seiji Kozaki, Tokyo (JP); Akinori Taira, Tokyo (JP); Kenichi Nakura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/492,480

(22) PCT Filed: Apr. 26, 2017

(86) PCT No.: PCT/JP2017/016597
§ 371 (c)(1),
(2) Date: Sep. 9, 2019

(87) PCT Pub. No.: WO2018/198239
PCT Pub. Date: Nov. 1, 2018

(65) Prior Publication Data
US 2020/0043339 A1    Feb. 6, 2020

(51) Int. Cl.
*G08G 1/16* (2006.01)
*B60Q 9/00* (2006.01)
(52) U.S. Cl.
CPC .............. *G08G 1/16* (2013.01); *B60Q 9/008* (2013.01)
(58) Field of Classification Search
CPC .................................. G08G 1/16; B60Q 9/008
USPC ....................................................... 340/436
See application file for complete search history.

(56) References Cited

U.S. PATENT DOCUMENTS

| | | | | |
|---|---|---|---|---|
| 4,334,214 A | * | 6/1982 | Satou ................ | G08B 13/2491 340/552 |
| 5,559,496 A | * | 9/1996 | Dubats ................ | G08B 25/10 340/539.26 |
| 5,991,428 A | * | 11/1999 | Taniguchi ............ | G06K 9/3241 348/155 |
| RE37,260 E | * | 7/2001 | Varga ................ | G01S 15/04 280/735 |
| 9,135,823 B2 | * | 9/2015 | Takaki ................ | G08G 1/166 |

(Continued)

FOREIGN PATENT DOCUMENTS

EP    1965366 A1    9/2008
JP    2000-151498 A   5/2000

(Continued)

OTHER PUBLICATIONS

Extended European Search Report for European Application No. 17907528.8, dated Apr. 8, 2020.

*Primary Examiner* — Ojiako K Nwugo
(74) *Attorney, Agent, or Firm* — Birch, Stewart, Kolasch & Birch, LLP

(57) ABSTRACT

A processing device according to the present invention includes an object identification unit that generates, based on data measured by sensors, an object identification information that is information indicative of a state of an object, and a reliability degree determination unit that determines a reliability degree of the object identification information using at least one of individual information of the sensors, environmental information obtained when the sensors have performed the measurement, and time information that is a time at which the sensors have performed measurement.

10 Claims, 16 Drawing Sheets

(56) References Cited

U.S. PATENT DOCUMENTS

| | | | |
|---|---|---|---|
| 2004/0149504 A1* | 8/2004 | Swoboda | B60K 31/0008 180/169 |
| 2006/0167633 A1* | 7/2006 | Satonaka | G08G 1/168 701/300 |
| 2008/0204208 A1* | 8/2008 | Kawamata | B60R 1/00 340/435 |
| 2009/0296680 A1 | 12/2009 | Suzuki et al. | |
| 2010/0198557 A1* | 8/2010 | Uemura | G01P 21/00 702/183 |
| 2010/0250064 A1* | 9/2010 | Ota | B60W 40/072 701/36 |
| 2010/0268452 A1 | 10/2010 | Kindo et al. | |
| 2011/0001615 A1* | 1/2011 | Kuoch | G06T 7/70 340/436 |
| 2013/0261951 A1* | 10/2013 | Sekiguchi | B60T 8/172 701/301 |
| 2013/0282357 A1 | 10/2013 | Rubin et al. | |
| 2015/0112571 A1* | 4/2015 | Schmudderich | B60W 50/0097 701/93 |
| 2015/0251600 A1 | 9/2015 | Mochizuki et al. | |
| 2015/0302738 A1 | 10/2015 | Geerlings et al. | |
| 2016/0005180 A1* | 1/2016 | Matono | H04N 13/239 348/47 |
| 2016/0042645 A1* | 2/2016 | Harada | B60W 50/16 701/117 |
| 2016/0116588 A1* | 4/2016 | Fukuman | G01S 15/931 367/89 |
| 2016/0121889 A1* | 5/2016 | Shimomura | B60W 50/14 701/41 |
| 2016/0138930 A1* | 5/2016 | Akiyama | H04W 4/029 701/465 |
| 2016/0159251 A1* | 6/2016 | Ebina | B60N 2/0248 701/49 |
| 2016/0217333 A1 | 7/2016 | Ozawa | |
| 2016/0356623 A1 | 12/2016 | Matsumoto | |
| 2017/0180707 A1* | 6/2017 | Hsu | G01S 17/46 |
| 2017/0236015 A1* | 8/2017 | Hattori | G06K 9/00818 382/103 |
| 2018/0038689 A1* | 2/2018 | Takemura | G08G 1/16 |
| 2018/0089505 A1* | 3/2018 | El-Khamy | G06K 9/6277 |
| 2018/0106885 A1* | 4/2018 | Blayvas | G01S 13/931 |
| 2018/0211536 A1* | 7/2018 | Akamine | B60W 30/09 |
| 2018/0357493 A1* | 12/2018 | Takamatsu | B60R 21/00 |

FOREIGN PATENT DOCUMENTS

| | | |
|---|---|---|
| JP | 2000-299642 A | 10/2000 |
| JP | 2002-25000 A | 1/2002 |
| JP | 2007-11490 A | 1/2007 |
| JP | 2008-309529 A | 12/2008 |
| JP | 2012-178184 A | 9/2012 |
| JP | 2013-129289 A | 7/2013 |
| JP | 5696487 B2 | 4/2015 |
| JP | 2015-114110 A | 6/2015 |
| JP | 2016-30513 A | 3/2016 |
| JP | 2016-48562 A | 4/2016 |
| JP | 2016-58044 A | 4/2016 |
| JP | 2016-139392 A | 8/2016 |
| JP | 2017-3310 A | 1/2017 |

* cited by examiner

FIG.3

ILLUSTRATION OF INFORMATION OBTAINED BY COMBINING

| SENSOR No. | OBJECT IDENTIFICATION INFORMATION | | | RELIABILITY DEGREE INFORMATION |
|---|---|---|---|---|
| | LOCATION OF OBJECT | SIZE OF OBJECT | SPEED OF OBJECT | RELIABILITY DEGREE |
| 1 | FAR | LARGE | SLOW | 3 |
| 2 | NEAR | SMALL | SLOW | 4 |
| . | . | . | . | . |
| . | . | . | . | . |
| n | . | . | . | . |

LOWERING OF RELIABILITY DEGREE WITH TIME WHEN SENSING OF OBJECT IS DIFFICULT

PROCESSING DEVICE

FIELD

The present invention relates to a processing device that uses an information piece of, for example, a sensor to generate an object identification information indicative of a state such as a location or speed of an object. The present invention also relates to a method of generating object identification information.

BACKGROUND

In recent years, research and development have been conducted of a function relating to an automatic operation that wholly or partially automatizes a driving operation of a transportation means such as an automobile or a railway. To implement this function, vehicles that implement the function or roadside devices disposed on a travel route need to be equipped with devices that observe surrounding conditions, such as sensors or cameras, and an in-vehicle device or a device external to the vehicles needs to generate object identification information using information obtained by these devices. The object identification information is information indicative of a state of a surrounding object such as another vehicle, a passer-by, or an obstacle and corresponds to, for example, information pieces such as presence, a size, a location, and a speed of the object.

Reliability of an information piece that is obtained from the sensor, the camera, or the like varies with, for example, a condition of an environment in which the sensor, the camera, or the like has operated, or individual accuracy.

A technique described in Patent Literature 1 can be taken as an example that evaluates quality of a sensor information piece obtained by a sensor mounted on a vehicle. The technique described in Patent Literature 1 is such that one or more in-vehicle sensor data pieces are transmitted to an information collection server where data quality is evaluated, and a token is transmitted to the vehicle based on an evaluation result. With the technique described in Patent Literature 1, data is transmitted from the vehicle's transmitter means in such a manner that vehicle individuality is not identified, so that with privacy protection being ensured for the vehicle transmitting the information, high-quality information pieces can be collected.

CITATION LIST

Patent Literature

Patent Literature 1: Japanese Patent Application Laid-open No. 2016-58044

SUMMARY

Technical Problem

In a probe car system described in Patent Literature 1, quality of a sensing datum transmitted from a vehicle is evaluated, and a token is transmitted if the quality is equal to or higher than a threshold. In this way, transmission of low-quality data is controlled, and as a result, higher-quality data is more preferentially utilized in a systematic manner. However, Patent Literature 1 only says that quality of a sensor information from a sensor detecting a state of the vehicle itself is determined, and does not at all disclose how to determine a reliability degree that is a degree of reliability of an object identification information. On the other hand, since object identification information is used in automatic operation, evaluation of reliability of the object identification information itself is rather important, and so determining the reliability degree of the object identification information is an important task.

The present invention has been made in view of the above circumstances, and an object of the present invention is to provide a processing device for object identification information, is capable of determining a reliability degree of the object identification information.

Solution to Problem

In order to solve the above-stated problems and achieve the object, the present invention provides a processing device comprising: an object identification unit to generate, based on data measured by a sensor, object identification information indicative of a state of an object; and a reliability degree determination unit to determine a reliability degree of the object identification information using at least one of individual information about the sensor, environmental information obtained when the sensor has performed measurement, and time information that is information on a time at which the sensor has performed measurement.

Advantageous Effect of Invention

The processing device according to the present invention has an advantageous effect of making it possible to determine the reliability degree of the object identification information.

BRIEF DESCRIPTION OF DRAWINGS

FIG. 3 is a chart illustrating information generated by a composition unit according to the first embodiment after the unit performs combination processing.

DESCRIPTION OF EMBODIMENTS

With reference to the drawings, a detailed description is hereinafter provided for processing devices and methods of generating object identification information according to embodiments of the present invention. It is to be noted that the embodiments do not necessarily restrict this invention.

First Embodiment

Figure 1:
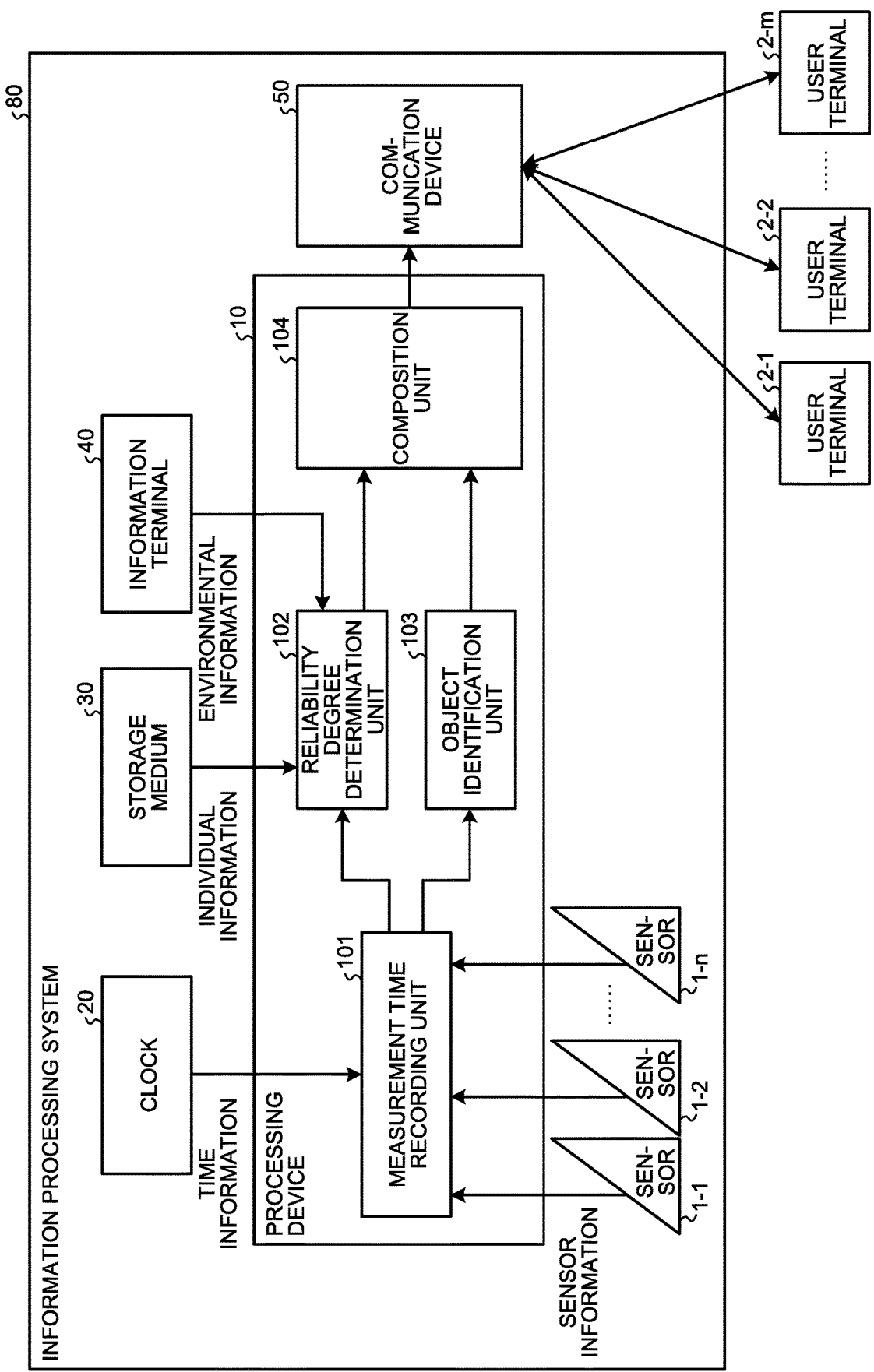
FIG. 1 is a diagram illustrating a configuration example of an information processing system according to a first embodiment.

FIG. 1 is a diagram illustrates a configuration example of an information processing system according to the first embodiment of the present invention. The information processing system 80 according to the first embodiment includes a processing device 10, a clock 20, a storage medium 30, an information terminal 40, a communication device 50, and sensors 1-1 to 1-n. The processing device 10 is a device intended to generate object identification information and includes a measurement time recording unit 101, a reliability degree determination unit 102, an object identification unit 103, and a composition unit 104. The object identification information is information indicative of a state of an object such as a vehicle or a passer-by. A specific example of the object identification information includes at least one of a size, a location, or a speed that corresponds to information representing the object's state.

The sensors 1-1 to 1-n each sense the object such as a vehicle for object identification. As a result of the sensing, each of the sensors generates a sensor information including the location, the speed, the size, and the like of the object and transmits the sensor information to the processing device 10. The clock 20 performs time measurement and transmits to the processing device 10 a time at which the processing device 10 receives the sensor information. From the storage medium 30, the processing device 10 reads out individual information such as a type or measurement accuracy of each of the sensors 1-1 to 1-n.

In the example described here, the individual information about each of the sensors 1-1 to 1-n is provided by the storage medium 30, but a method in which the processing device 10 acquires the individual information about each of the sensors 1-1 to 1-n is not limited to this example.

The information terminal 40 acquires environmental information that is information indicative of environmental conditions of the sensors 1-1 to 1-n from the Internet, including an ambient temperature, a humidity, a weather condition, and brightness of the sensors 1-1 to 1-n, and transmits the environmental information to the processing device 10. The communication device 50 includes a communication means capable of communication with user terminals 2-1 to 2-m and transmits the object identification information received from the processing device 10 and a reliability degree information that is a reliability degree of the object identification information to the user terminals 2-1 to 2-m. Each of the user terminals 2-1 to 2-m corresponds to a device having a communication function, including a terminal equipped in a vehicle or a passers-by's terminal device. When no individual distinction is made among the sensors 1-1 to 1-n, each of the sensors 1-1 to 1-n is hereinafter described as a sensor 1. When no individual distinction is made among the user terminals 2-1 to 2-m, each of the user terminals 2-1 to 2-m is hereinafter described as a user terminal 2.

Upon receiving the sensor information from the sensors 1-1 to 1-n, the measurement time recording unit 101 acquires, from the clock 20, the information on the time at which the sensor information has been received and adds the acquired time information as a measurement time to the sensor information. The time at which the processing device 10 receives the sensor information is set to the measurement time in this example, but in the case where the sensor 1 transmits the measured data along with a time at which the measurement has been made, the time received from the sensor 1 can be used as the measurement time in place of the time at which the sensor information has been received.

Based on the sensor information to which the time information is added, the reliability degree determination unit 102 determines the reliability degree. The reliability degree determination unit 102 outputs to the composition unit 104 the determined reliability degree as the reliability degree determination information. A method of determining the reliability degree only has to be a method using at least one of the time information, the individual information, and the environmental information and is not particularly limited in the present invention.

In the case where the reliability degree is defined on a scale of 1 to 5, where the greater the numeric value, the higher the reliability and is determined by using the individual information, there is, for example, a determination method in which an evaluation value is predetermined for each type of sensor in such a manner that the reliability degree is 3 if the sensor is of a lidar type and the reliability degree is 4 if the sensor is of an optical fiber type. In the case where the reliability degree is determined by using the environmental information, there is also a determination method in which the reliability degree is 1 if weather is rain and the reliability degree is 5 if the weather is clear. In the case where the reliability degree is determined by using the time information acquired by the measurement time recording unit 101, there is also, for example, a determination method in which the reliability degree is 2 if the time information is one minute or more past with respect to a time at which the reliability degree is determined and the reliability degree is 4 if the time information is 10 seconds or less past with respect to the same. Individual reliability degrees that are reliability degrees of the object identification information pieces respectively corresponding to the individual information, the environmental information, and the time information are determined and then the individual reliability degrees obtained by this determination are combined thereby making it possible to determine a conclusive reliability degree of the object identification information. In the case where a combination of two or more information pieces is used for the determination, conditioning or weighting on the determination can be used for the determination. If for example, the reliability degree is determined by using a combination of the individual information and the environmental information, there is a method of conditioning that, for example, a reliability degree resulting from the combination is always 1 when the reliability degree using the environmental information is 1 or a determination method in which when a reliability degree using the individual information is 5 and a reliability using the environmental information is 2, the reliability degree using the individual information is weighted and the reliability degree using the individual information is preferentially evaluated, whereby a reliability degree resulting from the combination is, for example, 4.

The object identification unit 103 performs object identification processing on the sensor information additionally having time information and outputs a result of the object identification processing as the object identification information to the composition unit 104. The object identification processing is not limited to a particular method in the present invention. There is, for example, an identification method in which based on the time information, the sensor information is subjected to statistical processing for each time to identify a size or the like of the object. The composition unit 104 joins together the reliability degree determination information piece outputted from the reliability degree determination unit 102 and the object identification information piece outputted from the object identification unit 103 to form one information piece and outputs the joined one to the communication device 50.

Figure 2:
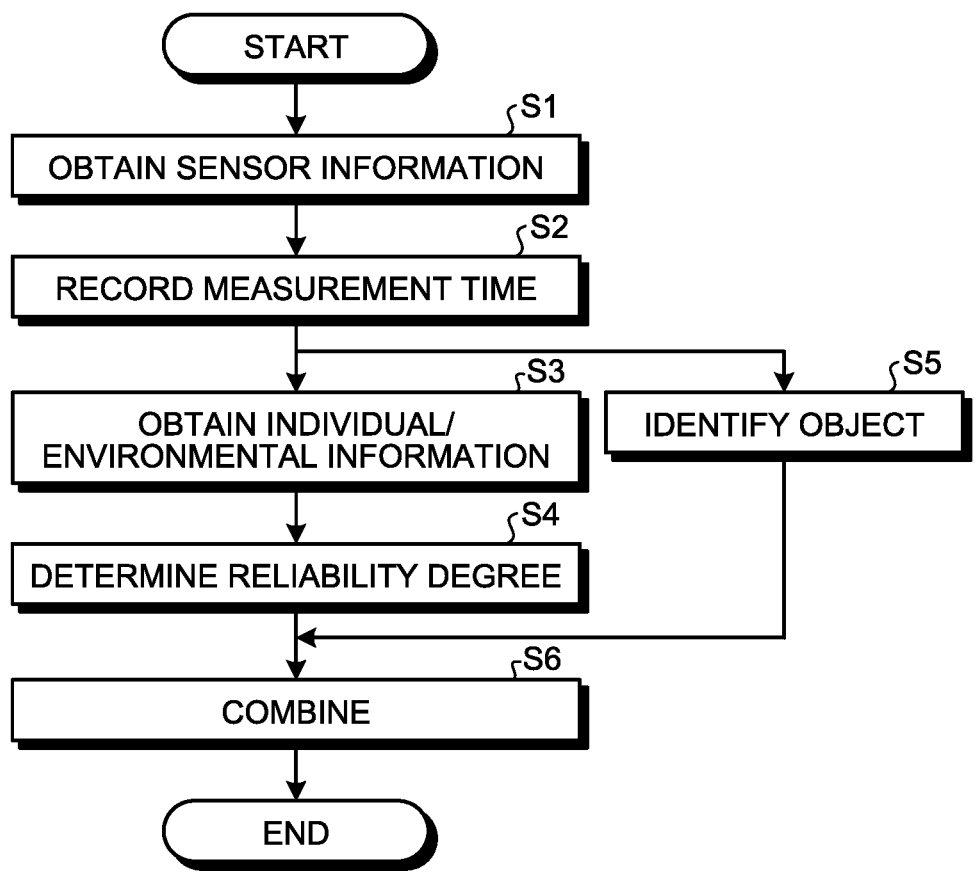
FIG. 2 is a flowchart illustrating an operation of a processing device according to the first embodiment.

FIG. 2 is a flowchart illustrating an operation of the processing device in the first embodiment. The sensor 1-1 senses the object and generates the sensor information. The processing device 10 acquires or receives the sensor information (step S1). The measurement time recording unit 101 provides, as a measurement time, the information on the time at which the measurement time recording unit 101 has received the sensor information (step S2). The reliability degree determination unit 102 acquires the individual information and the environmental information about the sensor 1-1 from the storage medium 30 and the information terminal 40, respectively (step S3) and performs the reliability degree determination processing based on the information added in step S3 to generate reliability degree information (step S4). In parallel with steps S3 and S4, the object identification unit 103 performs the object identification processing based on the sensor information to which the measurement time has been added in step S2 to generate the object identification information (step S5). As a result of the execution of steps S1 to S5, results of the reliability degree information and the object identification information are obtained for the sensor 1-1. The reliability degree information and the object identification information are thereafter combined by the composition unit 104 (step S6), and the combined information obtained in step S6 becomes output data of the processing device 10.

In the FIG. 2, description is given for a process using the data measured by the sensor 1-1. However, steps S1 to S5 are repeated n times for each of the sensors 1-1 to 1-n when n is equal to or higher than 2, and thereafter, step S6 is executed. With this execution, the object identification information and reliability degree information for each of the sensors 1-1 to 1-n are obtained and then the object identification information and the reliability degree information are combined into the output data of the processing device 10. For example, when the sensors 1-1 to 1-n transmit sensor information to the processing device 10, these sensors are supposed to make such transmission in a regular cycle. In this case, the composition unit 104 combines the object identification information and the reliability degree information for each of the sensors 1-1 to 1-n in a regular cycle and outputs a resultant combined information to the communication device 50.

The processing device 10 is capable of the object identification processing and the reliability degree determination processing on each of the sensor information pieces from the sensors 1-1 to 1-n in independent consideration of each of an influence of time passage, an influence of the sensor type or individual specificity, and an influence of the environmental conditions individually and even capable of the processings in consideration of a combination of these influences. Thus, the reliability degree of the object identification information can be determined with comprehensive use of the pieces of information that affect the reliability degree of the object identification information.

When the composition unit 104 performs its processing, the time information, the individual information, and the environmental information can be independently associated with the sensor information from the sensors 1-1 to 1-n. In other words, although the composition unit 104 combines the object identification information and the reliability degree information, this manner is not indispensable, and not only the object identification information and the reliability degree information but also one of the time information, the individual information, and the environmental information may be combined.

FIG. 3 is a chart illustrating information pieces generated by a combining process according to the first embodiment by the composition unit 104 according to the first embodiment performing the combining process. The information pieces generated as a result of the combining process according to the first embodiment each include the object identification information and the reliability degree information. While the object identification information piece is not limited to particular details, specific examples of such details include information pieces such as the location, the size, and the speed of the object, to name a few. As for how to define and determine the reliability degree, the above-mentioned examples are not indispensable. The reliability degree information may also include the individual information for each sensor, the environmental information for each sensor, the time information for each sensor, and others.

The number of the sensors 1 may be one or may be two or more. In the first embodiment, the reliability degree of the object identification information has been determined using all of the time information, the individual information, and the environmental information, but such determination can be made using any one or two of the above three kinds of information.

Figure 4:
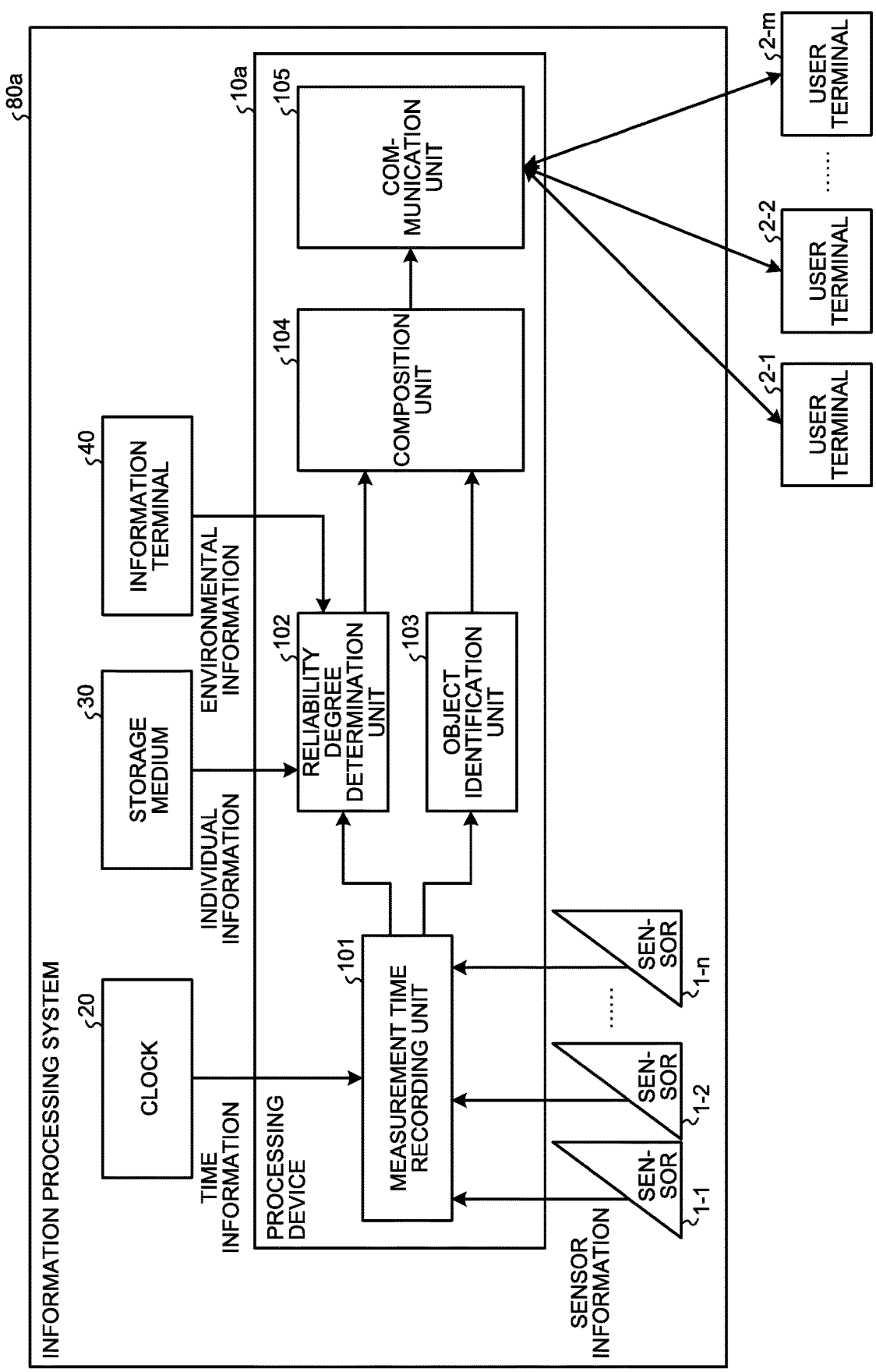
FIG. 4 is a diagram illustrating another configuration example of the information processing system according to the first embodiment.

In addition, as illustrated in FIG. 4, a communication unit 105 may be provided in a processing device 10a to cause the processing device 10 to perform generation and a reliability degree determination of object identification information in the same manner as in FIG. 1, and also notify the surrounding user terminals 2-1 to 2-m of the object identification information and the reliability degree information. The communication unit 105 is capable of communication with the user terminals 2-1 to 2-m.

Figure 5:
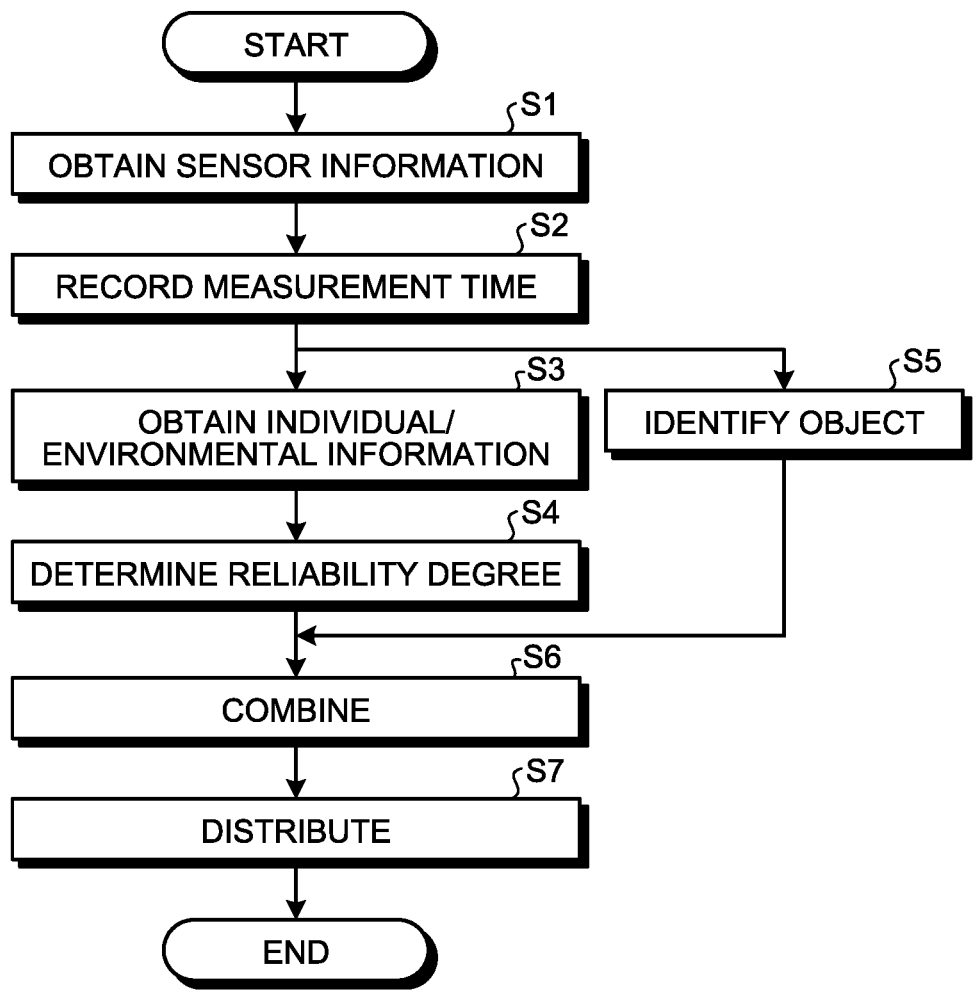
FIG. 5 is a flowchart illustrating an operation of a processing device in the other configuration according to the first embodiment.

FIG. 5 is a flowchart illustrating an operation of the processing device 10a including the communication unit 105. Compared with the flowchart of FIG. 2, the flowchart illustrated in FIG. 5 includes a distribution process (step S7) as an additional step. In step S7, the communication unit 105 notifies the user terminals 2-1 to 2-m of the object identification information and the reliability degree information. A suitable choice only has to be made between the configuration of FIG. 1 and the configuration of FIG. 4, depending on, for example, a physical relationship between the processing device 10a and a vehicle to be notified or a passer-by to be notified.

As described above, in the present embodiment, by virtue of the processing device 10 including the measurement time recording unit 101 that adds a measurement time to sensor information, the reliability degree determination unit 102 that determines a reliability degree, the object identification unit 103 that performs object identification processing, and the composition unit 104 that joins together a reliability degree determination information piece and an object identification information piece to form one information piece to output the joined one to the communication device 50, it is possible to determine the reliability degree using at least one of time information, individual information, or environmental information and transmit the reliability degree determination information and the object identification information to the communication device 50. The processing device 10 according to the present embodiment is therefore capable of determining the reliability degree. Consequently, the user terminals 2-1 to 2-m can receive the object identification information and the reliability degree information.

Second Embodiment

Figure 6:
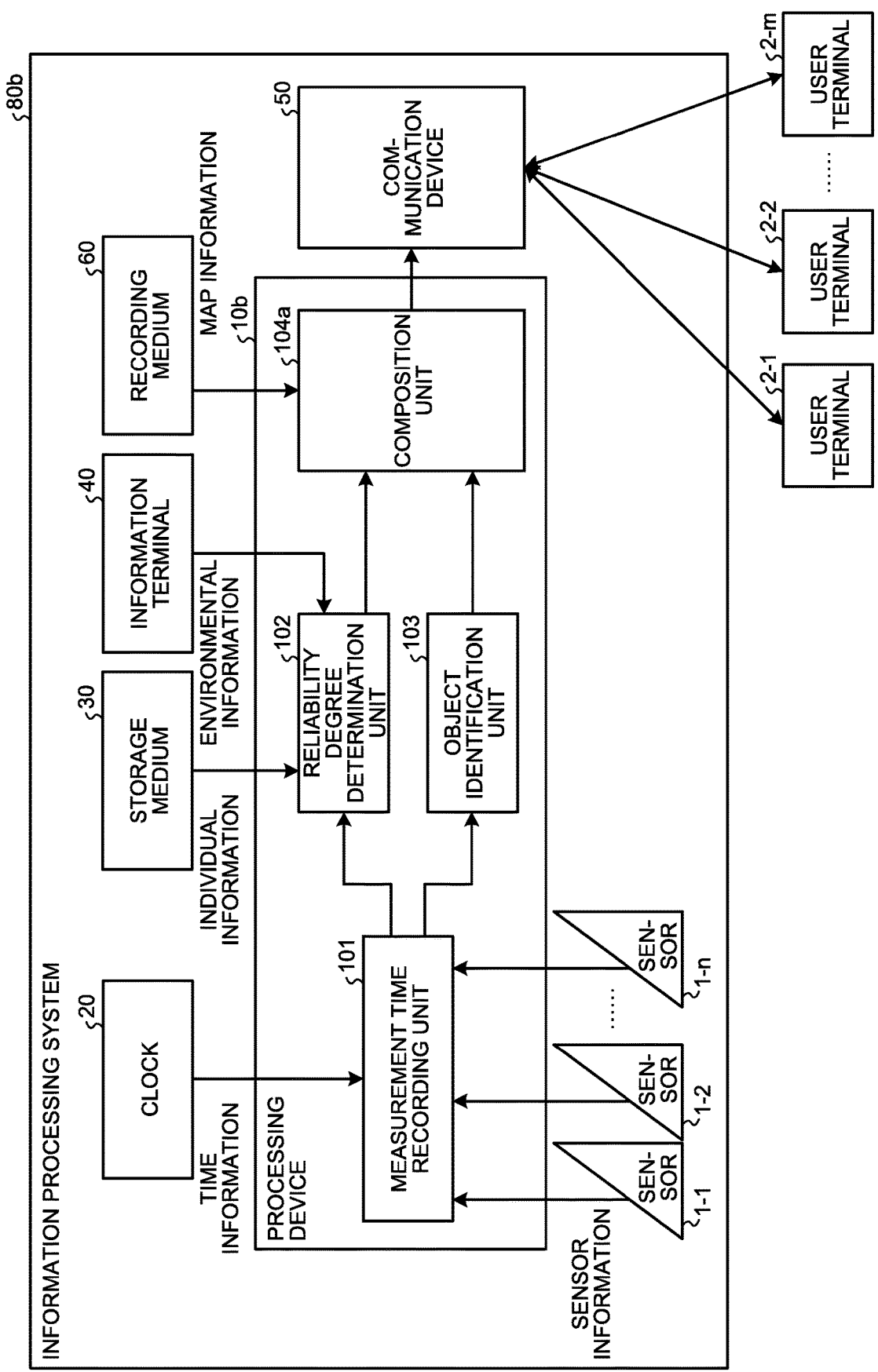
FIG. 6 illustrates a configuration example of an information processing system according to a second embodiment.

FIG. 6 is a diagram illustrating a configuration example of an information processing system according to the second embodiment of the present invention. In FIG. 6, a recording medium 60 stores map information. A composition unit 104a of a processing device 10b acquires the map information from the recording medium 60. The other constituent elements are the same as in the first embodiment. The constituent elements having the same functions as those in the first embodiment have the same reference signs as in the first embodiment to omit redundant description.

Figure 7:
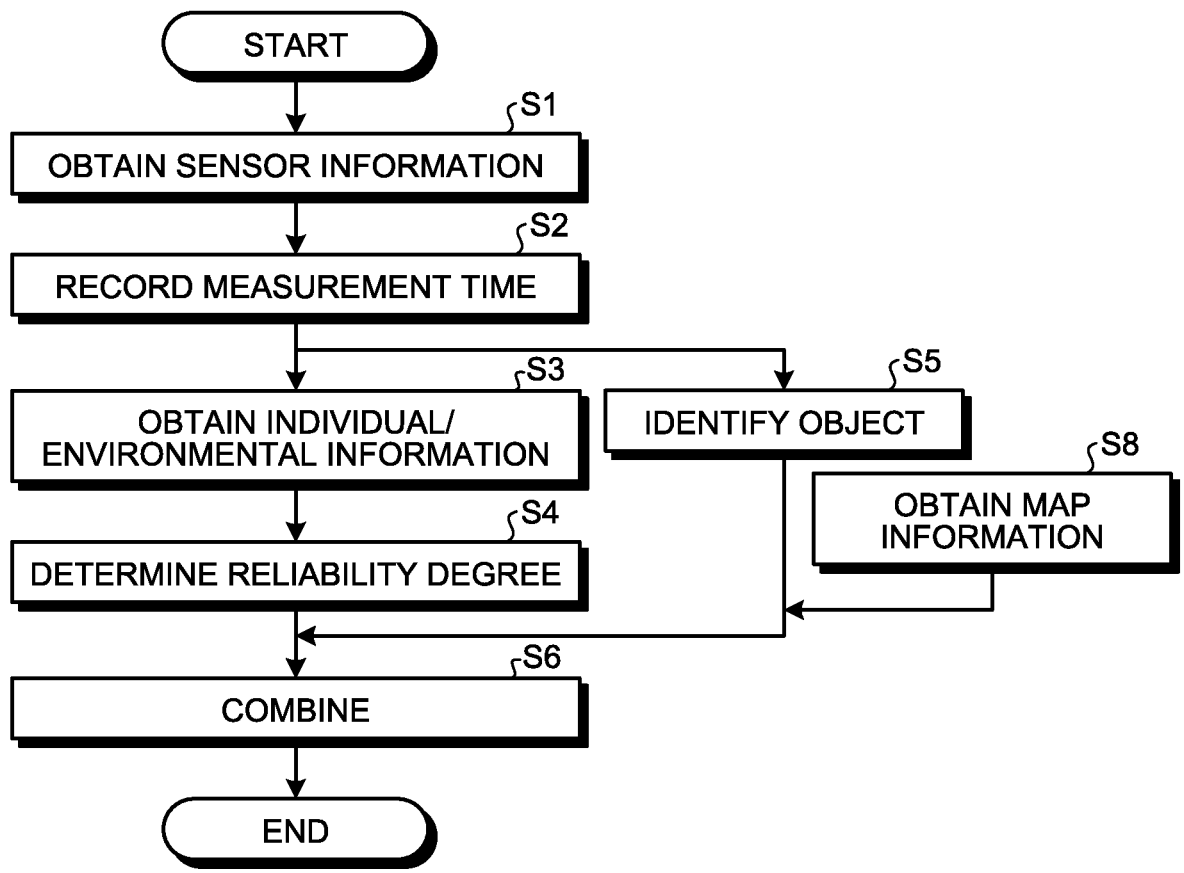
FIG. 7 is a flowchart illustrating an operation of a processing device according to the second embodiment.

FIG. 7 is a flowchart illustrating an operation of the processing device 10b according to the second embodiment of the present invention. A difference from the first embodiment is that a map information acquisition process (step S8) is added before a combining process that is carried out last.

The operation of the processing device 10b in FIG. 6 is described in conjunction with the flowchart of FIG. 7.

In the processing device 10b, the composition unit 104a reads out the map information from the recording medium 60 to acquire the map information. The composition unit 104a combines a result of processing of the object identification unit 103 and a result of processing of the reliability degree determination unit 102 in the same manner as in the first embodiment, and thereafter, further combines a result of the combining with the map information to transmit the combined result to the communication device 50. The other operations are identical to those in the first embodiment.

Figure 8:
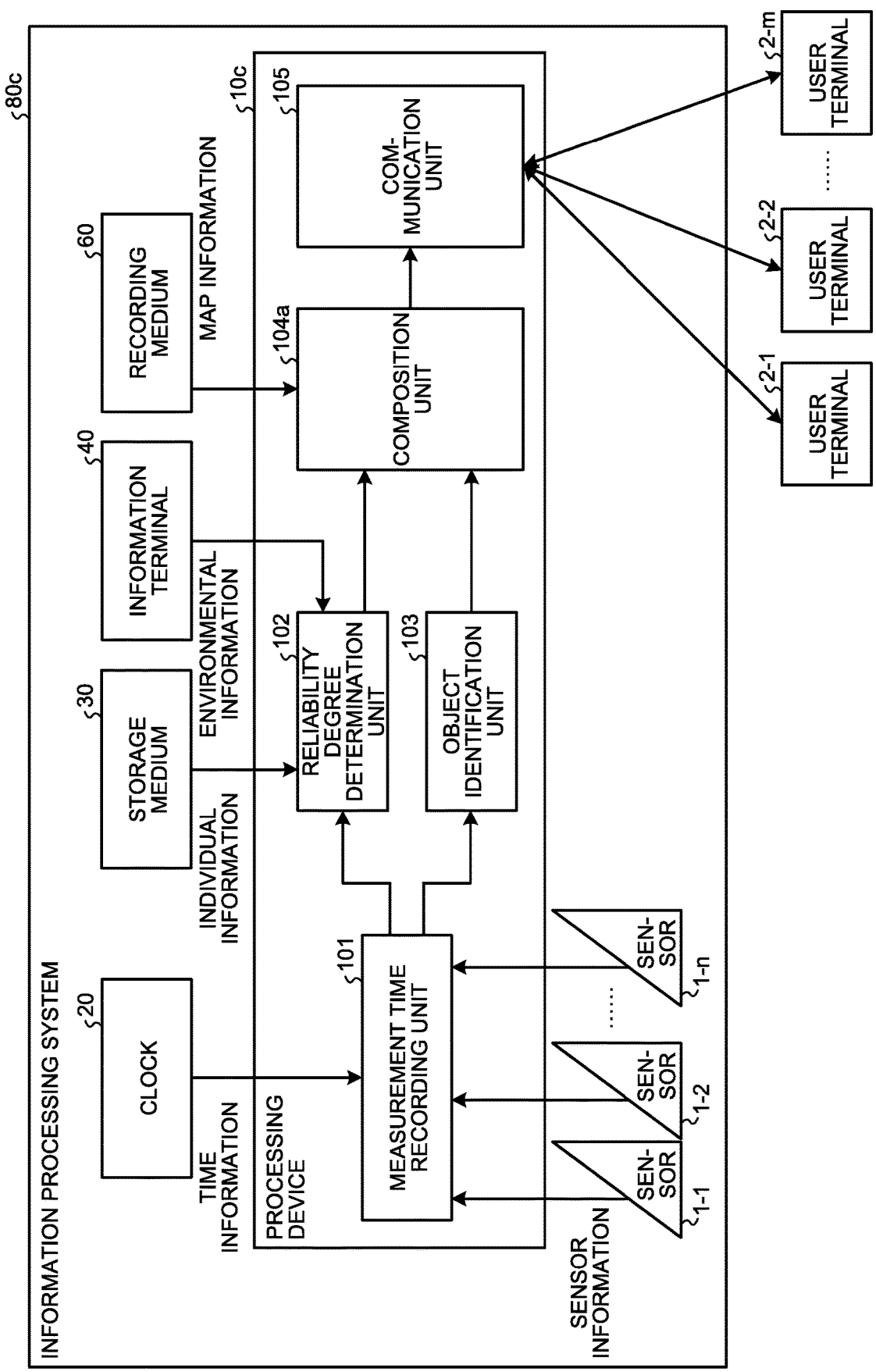
FIG. 8 is a diagram illustrating another configuration example of the information processing system according to the second embodiment.
Figure 9:
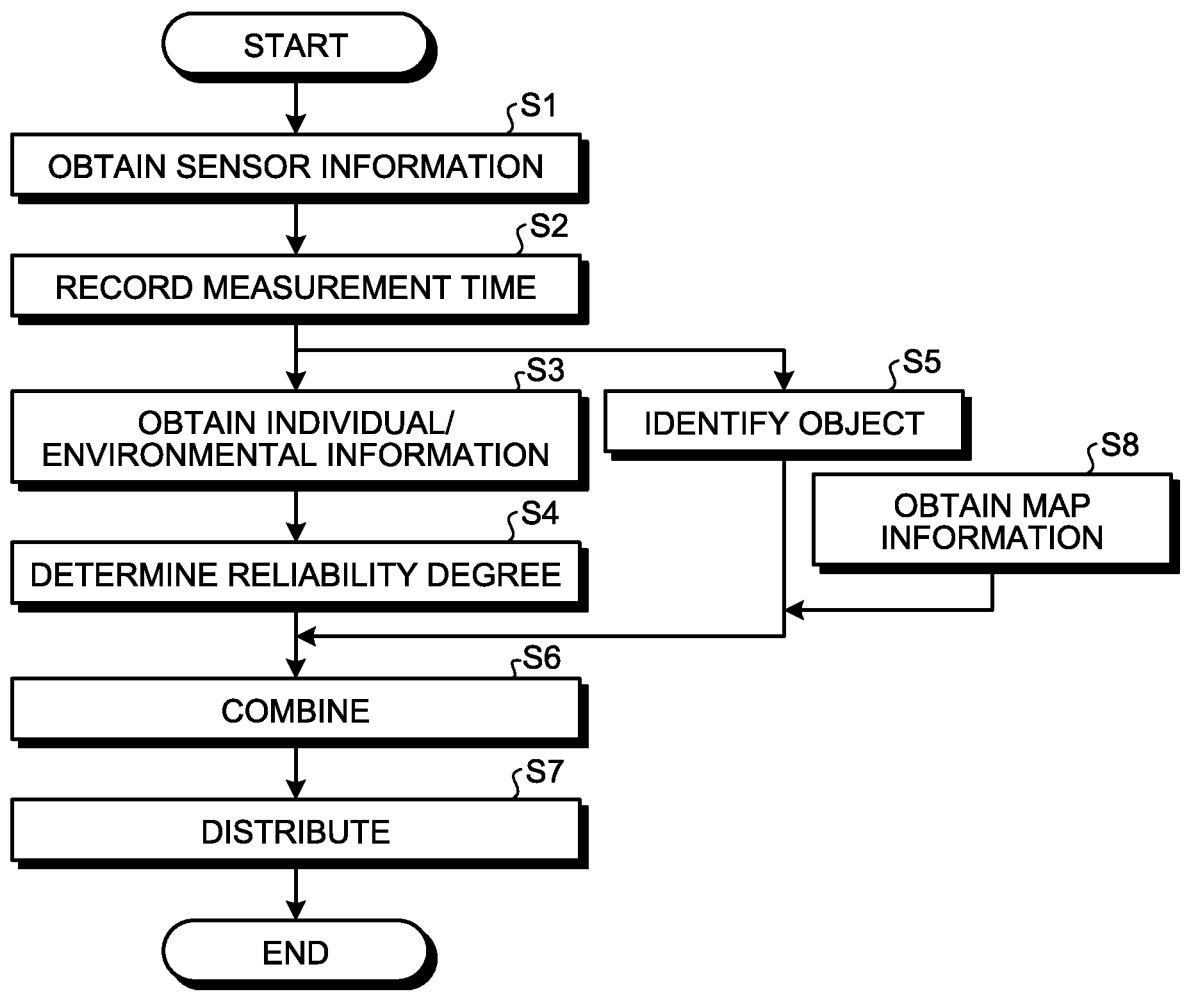
FIG. 9 is a flowchart illustrating an operation of a processing device in the other configuration according to the second embodiment.

As in the first embodiment, there may be used a single sensor, or two or more sensors. Processing can be realized using any combination of the time information, the individual information, and the environmental information. Furthermore, as illustrated in FIG. 8, such a configuration can be realized that a processing device 10c is internally provided with the communication unit 105. FIG. 9 is a flowchart that illustrates an operation of the processing device 10c in this configuration, to which a distribution process is added (step S7). The operation relating to this configuration is identical to that of the first embodiment except that the composition unit 104a further combines the map information. The processing device 10c is identical to the processing device 10b except that the device 10c has the communication unit 105.

As described above, the processing device 10b according to the present embodiment can combine the map information with the object identification information and the reliability degree information and transmit the combined result to surrounding user terminals 2-1 to 2-m via the communication device 50. As such, a user who possesses his or her user terminal having received the map information combined with the object identification information and the reliability degree information can have the object identification information and the reliability degree information displayed on or associated with a map when using the map during travel. In this way, the processing device 10b can help the user's consideration for travel decide moves.

Third Embodiment

Figure 10:
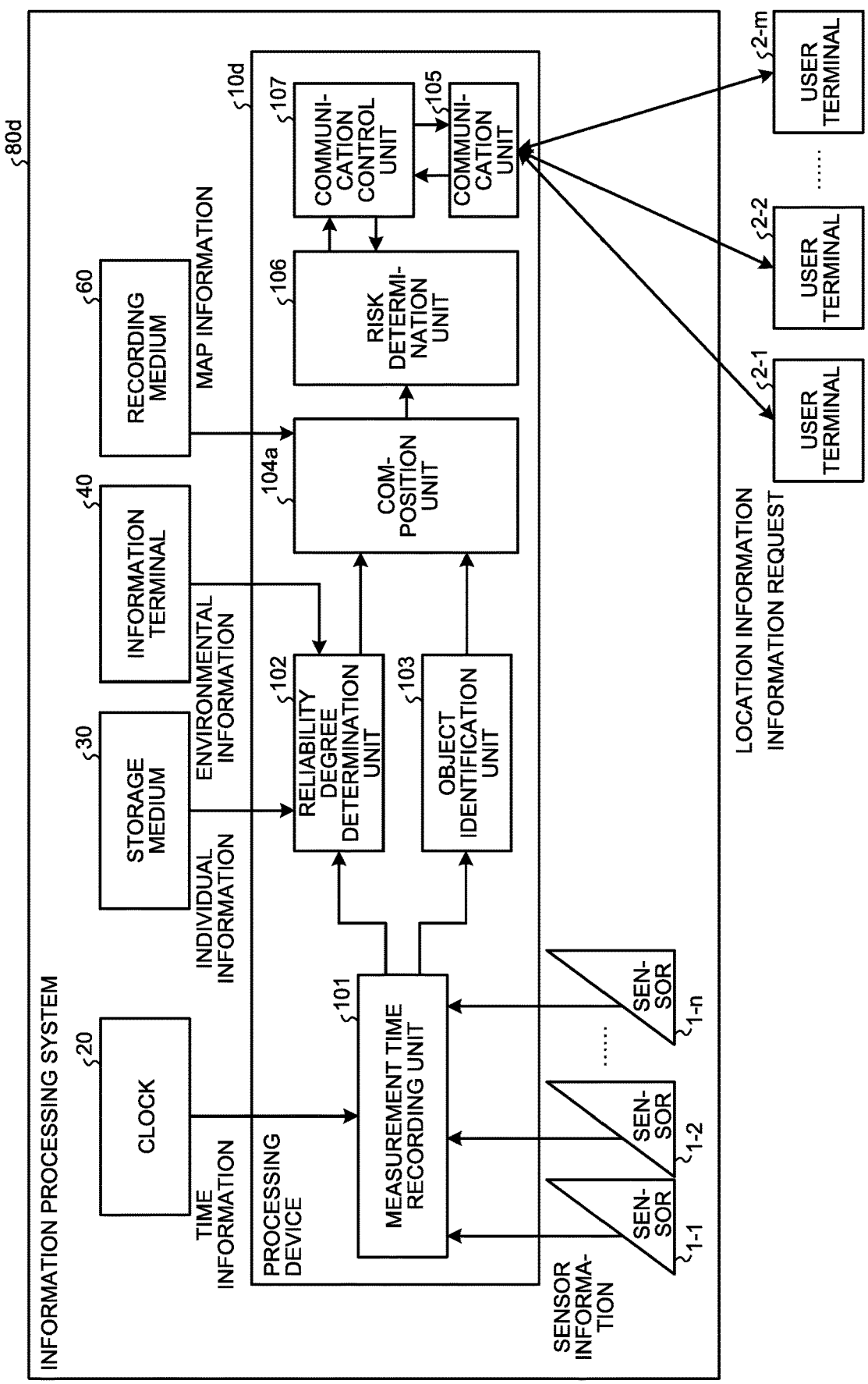
FIG. 10 is a diagram illustrating a configuration example of an information processing system according to a third embodiment.

FIG. 10 is a diagram illustrating a configuration example of an information processing system according to the third embodiment of the present invention. In FIG. 10, a communication control unit 107 has a function of collecting location information and an information request signal from the surrounding user terminals via the communication unit 105, and a function of determining the order of notifications and notifying the communication unit 105 of a result. The information request signal is a signal indicating that the user terminal 2 requests to acquire an object identification information.

Once the communication unit 105 performs a predetermined connection process with the user terminal 2, the communication unit 105 becomes able to communicate with the user terminal 2 until the connection is terminated. The communication unit 105 manages information on communicatable user terminals. A risk determination unit 106 receives the location information about the user terminal 2 from the communication control unit 107, determines a strength of possibility of approach to or collision with an object using the object identification information and a reliability degree information, and transmits, to the communication control unit 107, a result of this determination result along with the object identification information to which the map information and the reliability degree are added. The other constituent elements are the same as in the second embodiment. The constituent elements having the same functions as those in the second embodiment have the same reference signs as in the second embodiment to omit redundant description.

Figure 11:
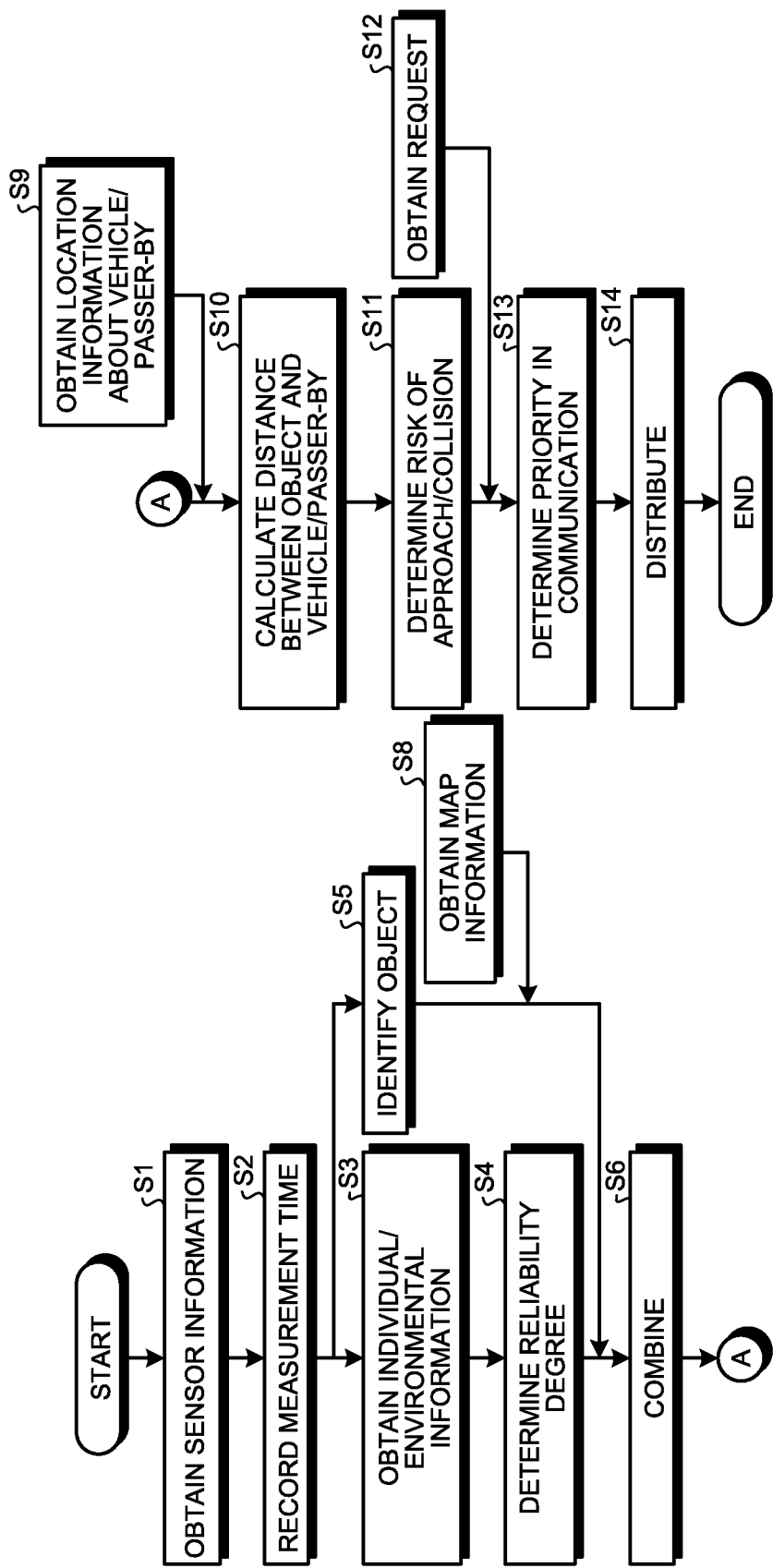
FIG. 11 is a flowchart illustrating an operation of a processing device according to the third embodiment.

FIG. 11 is a flowchart illustrating an operation of a processing device 10d according to the third embodiment of the present invention. The operation of the processing device 10d is described in conjunction with the flowchart of FIG. 11. The communication control unit 107 of the processing device 10d collects the location information about the user terminal 2-1 and forwards the location information to the risk determination unit 106. Specifically, the communication control unit 107 acquires the location information about the user terminal 2-1 from the user terminal 2-1 via the communication unit 105.

The user terminals 2-1 to 2-m each have a function of acquiring location information, such as a location acquisition function using a Global Positioning System (GPS) signal, for example. The risk determination unit 106 derives, from the object identification information and reliability degree information obtained from the composition unit 104a, a location, a speed, and others of the object (step S9), and calculates a distance between the user terminal 2-1 and the object (step S10). In the presence of the user terminals 2-1 to 2-m, steps S9 and S10 are repeated until this repetition is carried out for the user terminal 2-m. Based on that result, the risk determination unit 106 determines a risk of the user terminal 2-1 approaching or colliding with the object, that is to say, the strength of possibility of approach to or collision with the object (step S11), and transmits, to the communication control unit 107, the result of this risk determination along with the object identification and reliability degree information to which the map information has been added.

The strength of possibility of approach to or collision with the object may be calculated using any method. A usable example of the method is such that correspondences between distances between a user terminal and an object and strengths of possibility of approach to or collision with the object are predetermined in such a manner that the possibility increases in strength as the distance gets shorter, and the risk determination unit 106 retains these correspondences in a table or the like. In the presence of two or more user terminals 2, based on results of risk determination and the information request signals received from the user terminals 2-1 to 2-*m* (step S12), the communication control unit 107 selects a counterpart to which the object identification information and reliability degree information with the added map information should be transmitted, from among the user terminals 2-1 to 2-*m* (step S13). Specifically, the communication control unit 107 selects a counterpart to which the reliability degree information should be transmitted in such a manner that a user terminal 2 transmitting an information request signal is ahead notified before a user terminal 2 not transmitting an information request signal. For example, here is an assumption that the communication unit 105 can communicate with the user terminals 2-1 to 2-5, and in this state the information request signals are received from the user terminals 2-1 and 2-2, but not from the user terminals 2-3 to 2-5. Additionally, it is assumed that according to the risk determination results, the user terminal 2-1 has the strongest possibility of approach to or collision with the object, while the user terminal 2-2 has the second strongest possibility thereof after the user terminal 2-1. In these assumptions, the communication control unit 107 determines that the object identification information and reliability degree information with the map information added thereto should be transmitted first to the user terminal 2-1 and then to the user terminal 2-2.

The communication control unit 107 determines the order of notifications such that the object identification information and reliability degree information with the map information added thereto are transmitted to the user terminals 2-3 to 2-5 after being transmitted to the user terminals 2-1 and 2-2. The user terminals 2-3 to 2-5 are notified in descending order of strengths of possibility of approach to or collision with the object. Step S13 is not executed if the information request signal comes from a single user terminal. Lastly, in accordance with a selection result, the communication unit 105 distributes these information pieces (step S14).

As described above, the present embodiment can notify the user terminal having a higher risk of approaching or colliding with the object and the user terminal requesting the information preferentially of the object identification information and the reliability degree information. Also a configuration is possible such that the order of distributions to the user terminals 2-1 to 2-*m* based on the risks of the approach or collision that have been each determined using the location information about the user terminal, and the location, the speed, and others of the object. As such, a vehicle and a passers-by carrying the user terminals can use these information pieces more effectively.

The communication control unit 107 may determine the order of notifications based on only results of risk determination without using information request signals. In that case, the communication control unit 107 determines, based on the risk determination results, a counterpart to which the Object identification information and the reliability degree information from among the user terminals managed by the communication unit 105. In other words, the communication control unit 107 in this case determines the order of notifications of the object identification information and the reliability degree based on the risk determination results. Although the example described here is such that the risk determination unit 106 and the communication control unit 107 are added to the configuration of the second embodiment, the risk determination unit 106 and the communication control unit 107 may be added to the configuration of the first embodiment. In that case, steps S9 to S14 are executed after the combining of step S6 in the first embodiment.

Fourth Embodiment

Figure 12:
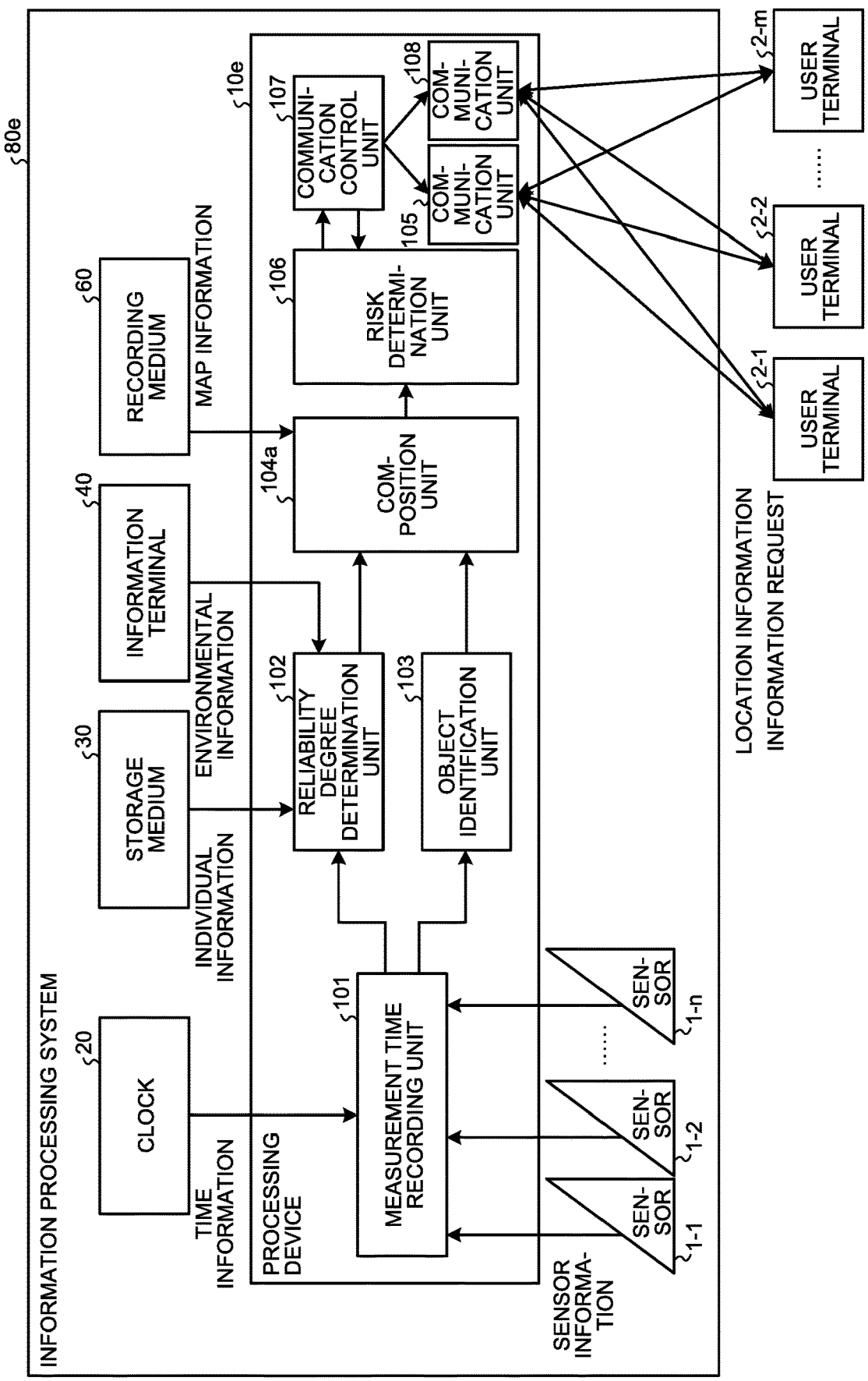
FIG. 12 is a diagram illustrating a configuration example of an information processing system according to a fourth embodiment.

FIG. 12 is a diagram illustrating a configuration example of an information processing system according to the fourth embodiment of the present invention. In FIG. 12, a processing device 10*e* includes not only the communication unit 105, but also two or more communication units 108 that are installed at different locations or have different communication methods. The configuration of the processing device 10*e* is identical to the third embodiment's configuration except that the plurality of communication units 108 are included therein. Constituent elements having the same functions as those in the third embodiment have the same reference signs as in the third embodiment to omit redundant description.

Figure 13:
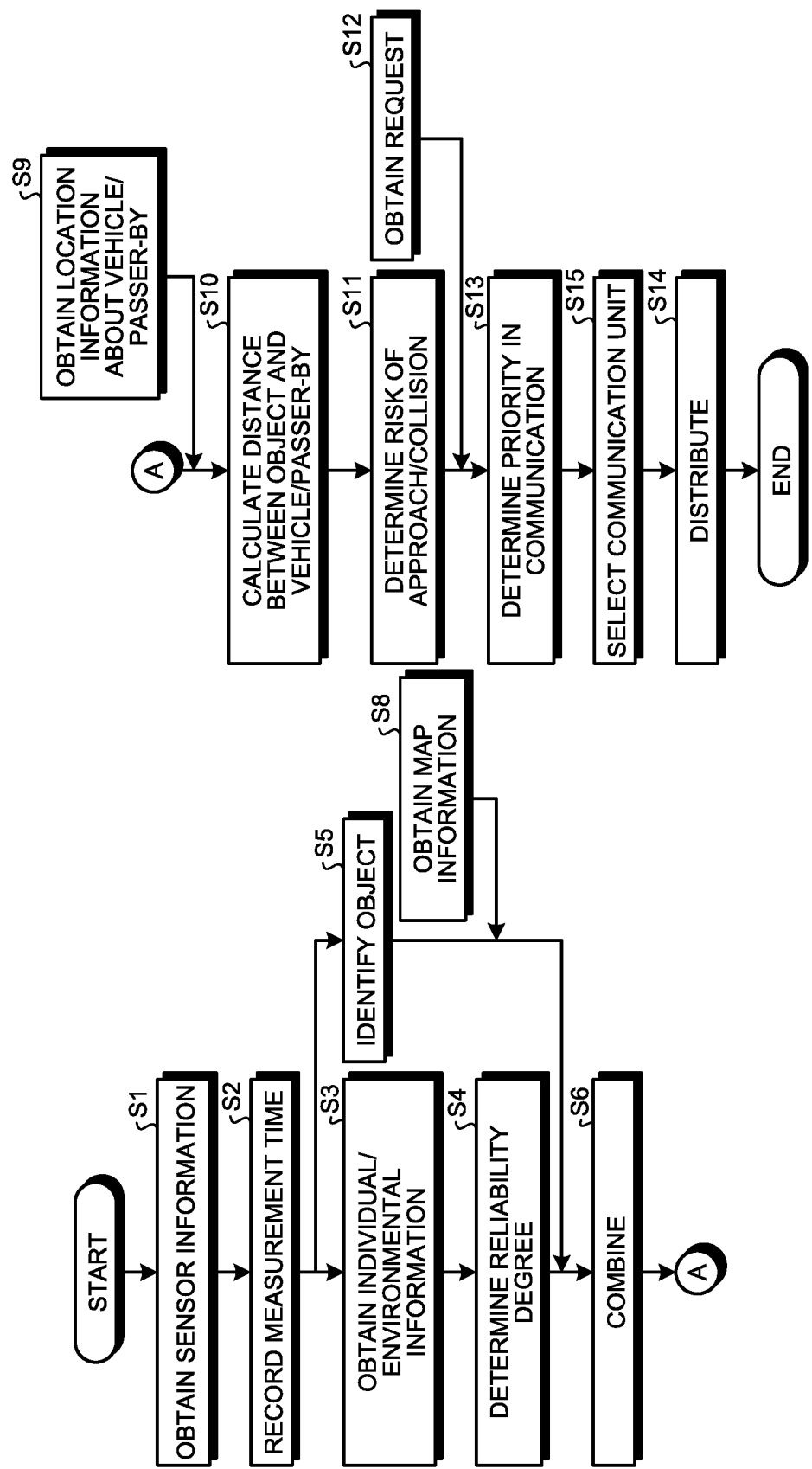
FIG. 13 is a flowchart illustrating an operation of a processing device according to the fourth embodiment.

An operation of the processing device 10*e* is described in conjunction with a flowchart of FIG. 13. As in the third embodiment, the communication control unit 107 determines the order of notifications based on results of risk determination and information request signals. The communication control unit 107 also selects, based on the risk determination results and the information request signals, a communication unit to be used for transmission of object identification information and reliability degree determination information to a user terminal.

In the present embodiment described above, the appropriate communication unit can be selected for distribution according to a vehicle or a passer-by to which the object identification information and the reliability degree determination information should be transmitted. As such, the processing device 10*e* can notify of the above kinds of information more reliably in a shorter time as compared to the third embodiment.

Ranging from step S1 to step S5, object identification processing and reliability degree determination processing based on the time information, the individual information, the environmental information, and the sensor information obtained from the sensors 1-1 to 1-*n* can be repeated by the processing device 10*e* as many times as any number of measurements (k times). Based on the object identification information and reliability degree information that has been subjected to this k-time repetition, the composition unit 104*a* generates a conclusive object identification information and reliability degree information.

By the processing device 10*e* operating in this way, an object identification information generation process and a reliability degree determination process can be realized while taking into consideration a factor of degradation in measurement accuracy, such as a measurement error included in the sensor information or sudden change in environmental condition. The above-mentioned measurement error is caused by some unpredictable factor such as variation of the sensor information pieces, and the sudden change in environmental condition is caused by a difference in brightness due to a puddle on a road or a change in sunshine condition, for example.

In addition to the repetition for as many times as any number of measurements (k times), temporal accumulation of a plurality of measurement information pieces obtained from the sensors 1-1 to 1-$n$ can be performed. After object identification processing is performed by the object identification unit 103, temporal accumulation is carried out, and its result is inputted to reliability degree determination processing and object identification processing. This process causes the object identification unit 103 and the reliability degree determination unit 102 to update processed results of the object identification and reliability degree determination with a lapse of time for the k-times measurements (k is a plural number).

Figure 14:
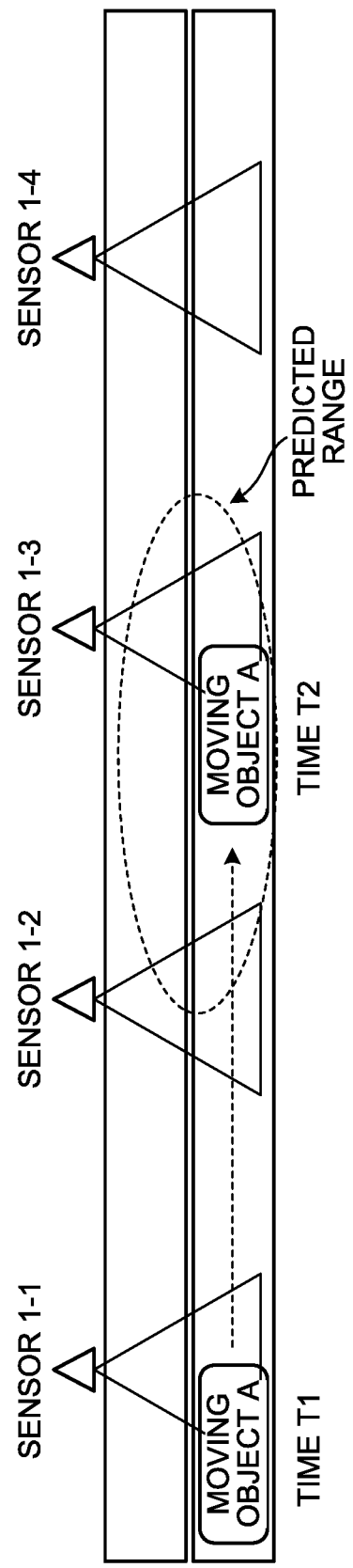
FIG. 14 is a chart illustrating an application according to the fourth embodiment.

With execution of the above process, a factor that changes with time can be reflected in the object identification information and the reliability degree information. FIG. 14, for example, illustrates the sensors 1-1 to 1-4 set on the roadsides, which sense a moving object A moving on a road from a time T1 to a time T2. In this figure, if sensor information obtained by the sensors 1-1 and 1-2 measuring a number of times is used, a moving direction can be predicted, and it can also be predicted that the moving object A exists in a range indicated by a dotted line in the figure at the time T2. This enables at the time T2, for example, object identification processing with an increased level of importance placed on measurement information obtained from the sensor 1-3 located at a predicted position, processing for improving a reliability degree of an object identification information generated using the sensor information from the sensor 1-3, or other processing.

In general, measurement errors of most sensors are made to be smaller with decreasing a distance between their installation location and an object to be measured, so that the above process improves accuracy of the object identification processing and also raises the reliability degree.

Figure 15:
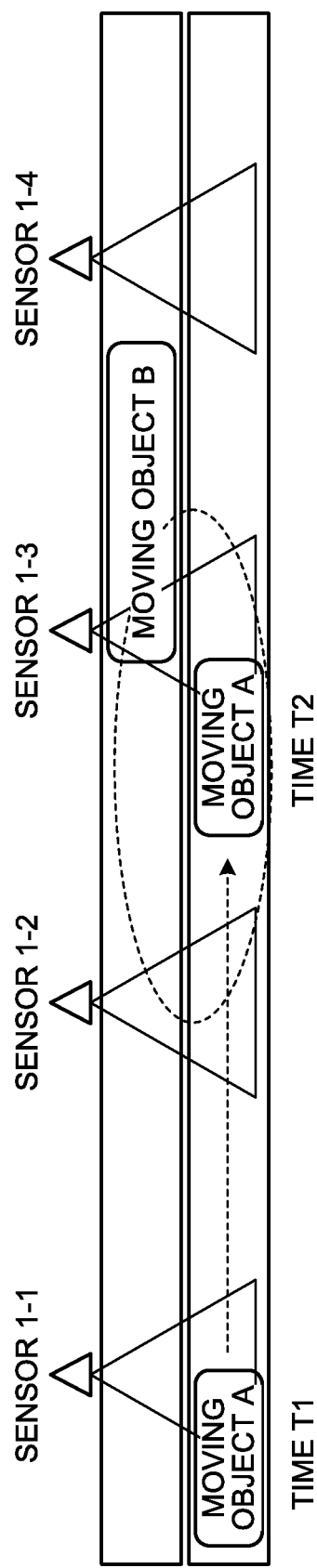
FIG. 15 is a chart illustrating another application according to the fourth embodiment.

As another example, an application illustrated in FIG. 15 is also useful. This drawing illustrates a situation where the roadside sensors 1-1 to 1-4 as in FIG. 14 sense the moving object A moving on the road from the time T1 to the time T2. In this example, a situation is caused such that a moving object B is present in a measuring range of the sensor 1-3 at the time T2 and hinders the sensor 1-3 from measuring the moving object A. For this reason, a sensor information cannot be obtained from the sensor 1-3 at the time T2. In this case, a process of the reliability degree determination unit 102 is allowed such that a reliability degree of object identification information using sensor information of the sensors 1-1 and 1-2, for example, is lowered with a lapse of time.

In general, accuracy of an information piece such as a location, a speed, or the like of a moving object lowers as a sensor information piece gets old. Therefore, by performing the above processing, a more proper value for the reliability degree of object identification information can be obtained.

The measurement time recording unit 101, the reliability degree determination unit 102, the object identification unit 103, the composition unit 104, the composition unit 104$a$, the risk determination unit 106, and the communication control unit 107 of the first through fourth embodiments are implemented by use of a processing circuit that is an electronic circuit that carries out their respective processings. The herein-mentioned processing circuit may be dedicated hardware or may be control circuitry including a memory and a central processing unit (CPU) that executes a program stored in the memory. The memory mentioned here corresponds to, for example, a magnetic disk, an optical disk, or a nonvolatile or volatile semiconductor memory such as a random-access memory (RAM), a read-only memory (ROM), or a flash memory. The control circuitry is, for example, a control circuit 700 having a configuration illustrated in FIG. 16.

Figure 16:
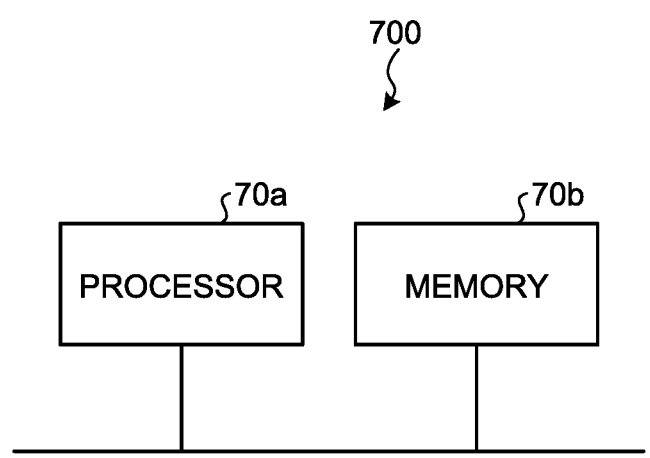
FIG. 16 is a diagram illustrating a configuration example of a control circuit of the third embodiment.

As illustrated in FIG. 16, the control circuit 700 includes a processor 70$a$ that is a CPU, and a memory 70$b$. In the case where the control circuit 700 shown in FIG. 16 is used for the implementation, the processor 70$a$ reads out a program corresponding to each of the processings, stored in the memory 70$b$ and executes the program. The memory 70$b$ is also used as a temporary memory for the processings carried out by the processor 70$a$. The communication unit 105 is implemented by use of a receiver and a transmitter. In the case where the processing circuit is a dedicated hardware set, the processing circuit is, for example, an application specific integrated circuit (ASIC), a field programmable gate array (FPGA), or a combination of them.

The above configurations illustrated in the embodiments are illustrative of examples of contents of the present invention, and can be combined with other publicly known techniques and partly omitted and/or modified without departing from the scope of the present invention.

REFERENCE SIGNS LIST

1-1 to 1-$n$ sensor; 2-1 to 2-$m$ user terminal; 10, 10$a$, 10$b$, 10$c$, 10$d$, 10$e$ processing device; 20 clock; 30 storage medium; 40 information terminal; 50 communication device; 60 recording medium; 101 measurement time recording unit; 102 reliability degree determination unit; 103 object identification unit; 104, 104$a$ composition unit; 105, 108 communication unit; 106 risk determination unit; 107 communication control unit; 700 control circuit; 70$a$ processor; 70$b$ memory; 80, 80$a$, 80$b$, 80$c$, 80$d$, 80$e$ information processing system.

The invention claimed is:

1. A processing device comprising:
an object identification circuit to generate, based on data measured by a sensor, object identification information indicative of a state of an object; and
a reliability degree determiner to determine a reliability degree of the object identification information using at least one of individual information about the sensor, environmental information obtained when the sensor has performed measurement, and time information that is information on a time at which the sensor has performed measurement,
wherein: a moving direction of the object is identified from information on a location and a speed of the object that are included in an old version of the object identification information; and measurement data from the sensor disposed along the moving direction is preferentially used to generate the object identification information and determine the reliability degree.

2. The processing device according to claim 1, wherein the reliability degree determiner determines the reliability degree using the individual information, the environmental information, and the time information.

3. The processing device according to claim 1, comprising a communicator to notify a terminal equipped in a vehicle or a terminal carried by a passer-by of the object identification information and the reliability degree.

4. The processing device according to claim 3, comprising:
- a risk determiner to determine a strength of possibility of approach to or collision with the object; and
- a communication controller to determine the order of notifications of the object identification information and the reliability degree based on a determination result of the risk determiner.

5. The processing device according to claim 4, wherein:
- the communicator receives an information request signal for the object identification information from the terminal; and
- the communication controller determines the order of notifications of the object identification information and the reliability degree, further based on the information request signal.

6. The processing device according to claim 3, comprising:
- a plurality communicators each corresponding to the communicator;
- a risk determiner to determine a strength of possibility of approach to or collision with the object; and
- a communication controller to determine the order of notifications of the object identification information and the reliability degree based on a determination result of the risk determiner and to select, based on the determination result, a communicator to be used for notification of the object identification information and the reliability degree from among the plurality of communicators.

7. The processing device according to claim 6, wherein:
- the communicators receive from the terminal an information request signal that is indicative of a request to acquire the object identification information; and
- the communication controller determines the order of notifications of the object identification information and the reliability degree further based on the information request signal and selects, based on the information request signal, a communicator to be used for notification of the object identification information and the reliability degree from among the plurality of communicators.

8. The processing device according to claim 1, wherein the reliability degree determiner determines individual reliability degrees that are reliability degrees of the object identification information corresponding to the individual information, the environmental information, and the time information, respectively, and combines the individual reliability degrees obtained by the determination to determine a final reliability degree of the object identification information.

9. The processing device according to claim 1, wherein conclusive determination of the reliability degree is performed using two or more reliability degrees of the object identification information obtained by multiple measurements.

10. The processing device according to claim 1, comprising a composition circuit to combine the object identification information and information on the reliability degree with map information.

* * * * *